US009927237B2

(12) United States Patent
Kimishima

(10) Patent No.: US 9,927,237 B2
(45) Date of Patent: Mar. 27, 2018

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Masato Kimishima, Tokyo (JP)

(73) Assignee: SONY CORPORATION, Tokyo (JP)

(*) Notice: Subject to any disclaimer, the term of this patent is extended or adjusted under 35 U.S.C. 154(b) by 110 days.

(21) Appl. No.: 14/911,859

(22) PCT Filed: Jun. 25, 2014

(86) PCT No.: PCT/JP2014/066871
§ 371 (c)(1),
(2) Date: Feb. 12, 2016

(87) PCT Pub. No.: WO2015/025614
PCT Pub. Date: Feb. 26, 2015

(65) Prior Publication Data
US 2016/0187134 A1 Jun. 30, 2016

(30) Foreign Application Priority Data
Aug. 22, 2013 (JP) .................. 2013-172384

(51) Int. Cl.
G01C 17/38 (2006.01)
G01C 17/28 (2006.01)
G01C 17/02 (2006.01)
G01C 21/26 (2006.01)
G01C 21/16 (2006.01)
G01C 21/30 (2006.01)

(52) U.S. Cl.
CPC ............. *G01C 17/38* (2013.01); *G01C 17/02* (2013.01); *G01C 17/28* (2013.01); *G01C 21/16* (2013.01); *G01C 21/26* (2013.01); *G01C 21/30* (2013.01)

(58) Field of Classification Search
CPC ..................................................... G01C 17/38
USPC ............................................................. 33/356
See application file for complete search history.

(56) References Cited

U.S. PATENT DOCUMENTS 5,235,514 A * 8/1993 Matsuzaki ............. G01C 17/38
340/995.28
2008/0051987 A1* 2/2008 Okeya ................... G01C 17/38
701/449
2011/0066363 A1* 3/2011 Kimishima ............ G01C 21/26
701/532

(Continued)

FOREIGN PATENT DOCUMENTS

JP 03-279809 12/1991
JP 06-149355 5/1994

(Continued)

Primary Examiner — G. Bradley Bennett
(74) Attorney, Agent, or Firm — Paratus Law Group, PLLC

(57) ABSTRACT

To be capable of realizing a technique which enables a measurement error of a magnetic sensor to be obtained with higher accuracy, there is provided an information processing apparatus including: a fluctuation measuring unit configured to measure temporal fluctuation of a magnetic value measured by a magnetic sensor during movement of at least the magnetic sensor or information obtained based on the magnetic value, and a measurement error acquiring unit configured to obtain a measurement error of the magnetic sensor based on the fluctuation.

20 Claims, 15 Drawing Sheets

(56) References Cited

U.S. PATENT DOCUMENTS

| | | | | |
|---|---|---|---|---|
| 2013/0261959 | A1* | 10/2013 | Kimishima | G01S 19/40 701/445 |
| 2014/0058703 | A1* | 2/2014 | Kimishima | G06F 19/3481 702/177 |
| 2014/0180626 | A1* | 6/2014 | Kimishima | G01C 22/006 702/142 |
| 2016/0327627 | A1* | 11/2016 | Almalki | G01R 35/005 |

FOREIGN PATENT DOCUMENTS

| | | |
|---|---|---|
| JP | 2004-264028 | 9/2004 |
| JP | 2005-291934 | 10/2005 |
| JP | 2008-281494 | 11/2008 |
| JP | 2010-145115 | 7/2010 |

\* cited by examiner

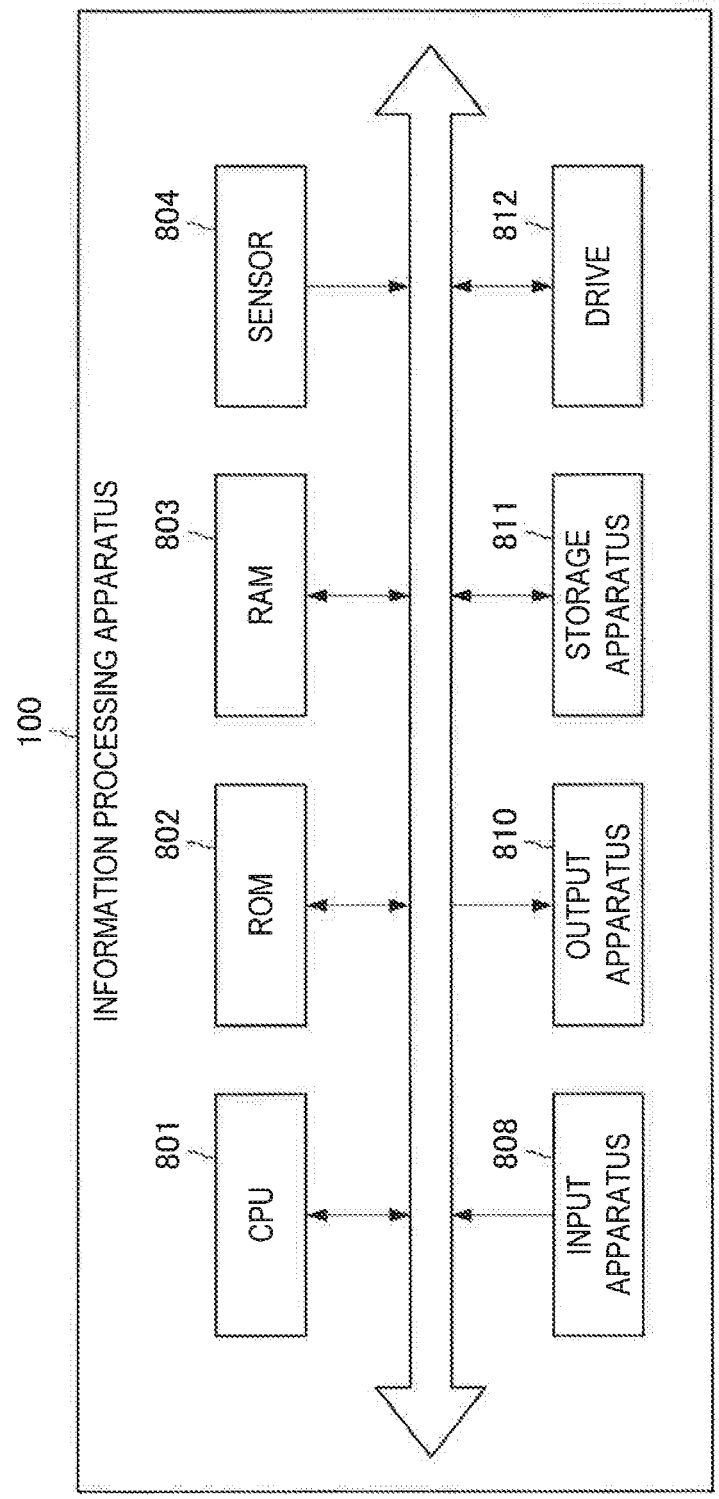

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2014/066871 (filed on Jun. 25, 2014) under 35 U.S.C. §371, which claims priority to Japanese Patent Application No. 2013-172384 (filed on Aug. 22, 2013), which are all hereby incorporated by reference in their entirety.

TECHNICAL FIELD

The present disclosure relates to an information processing apparatus, an information processing method, and a recording medium.

BACKGROUND ART

In recent years, various techniques have been disclosed as a technique for obtaining a measurement error as a geomagnetic sensor of a magnetic sensor. For example, a technique is disclosed in which registration information in which a measurement position is associated with depression of geomagnetism is prepared as a database, and, when the measurement position and the depression of geomagnetism as actual measured information are acquired, it is judged whether or not a measurement error as the geomagnetic sensor falls within a normal range based on a comparison result of the registration information and the actual measured information (see, for example, Patent Literature 1)

CITATION LIST

Patent Literature

Patent Literature 1: JP 2004-264028A

SUMMARY OF INVENTION

Technical Problem

However, it is desirable to realize a technique which enables a measurement error of a magnetic sensor to be obtained with higher accuracy.

Solution to Problem

According to the present disclosure, there is provided an information processing apparatus including: a fluctuation measuring unit configured to measure temporal fluctuation of a magnetic value measured by a magnetic sensor during movement of at least the magnetic sensor or information obtained based on the magnetic value; and a measurement error acquiring unit configured to obtain a measurement error of the magnetic sensor based on the fluctuation.

According to the present disclosure, there is provided an information processing method including: measuring temporal fluctuation of a magnetic value measured by a magnetic sensor during movement of at least the magnetic sensor or information obtained based on the magnetic value; and obtaining a measurement error of the magnetic sensor based on the fluctuation.

According to the present disclosure, there is provided a computer-readable recording medium recording a program thereon, the program causing a computer to function as an information processing apparatus including a fluctuation measuring unit configured to measure temporal fluctuation of a magnetic value measured by a magnetic sensor during movement of at least the magnetic sensor or information obtained based on the magnetic value, and a measurement error acquiring unit configured to obtain a measurement error of the magnetic sensor based on the fluctuation.

Advantageous Effects of Invention

According to the present disclosure as described above, it is possible to obtain a measurement error of a magnetic sensor with higher accuracy.

BRIEF DESCRIPTION OF DRAWINGS

FIG. 17 is a diagram illustrating an example of a hardware structure of the information processing apparatus according to the embodiment of the present disclosure.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the "description of embodiments" will be described in the following order.
1. Outline of information processing apparatus
2. Details of information processing apparatus
2-1. Example of functional configuration of information processing apparatus
2-2. Calculation of measurement error
2-3. Specification of azimuth or posture
2-4. Correction of positioning position
2-5. Storage of passage history
3. Example of hardware structure
4. Conclusion

1. Outline of Information Processing Apparatus

Figure 1:
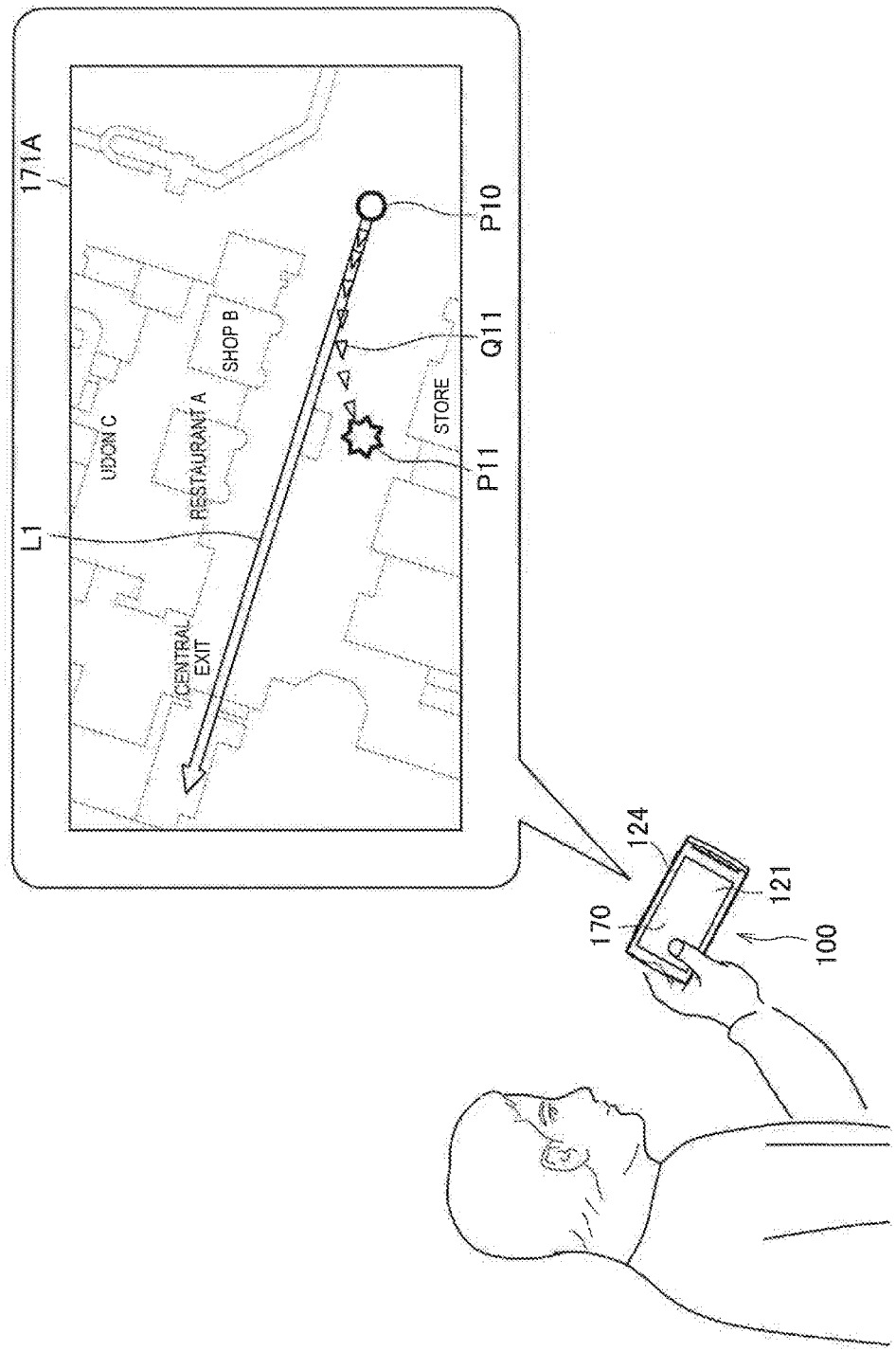
FIG. 1 is a diagram for explaining outline of an information processing apparatus according to an embodiment of the present disclosure.

First, outline of an information processing apparatus 100 according to an embodiment of the present disclosure will be described. FIG. 1 is a diagram for explaining outline of the information processing apparatus 100 according to the embodiment of the present disclosure. Referring to FIG. 1, the information processing apparatus 100 causes map information 171A to be displayed at a display unit 170. Two dimensional coordinate in the map information 171A is associated with a position (such as, for example, latitude and longitude) in a horizontal direction in real space.

Further, referring to FIG. 1, a user has a positioning sensor 124. The positioning sensor 124 can measure a position of the user. For example, when the position of the user is measured using the positioning sensor 124, the information processing apparatus 100 may cause a predetermined mark to be displayed at a position corresponding to the position of the user in the map information 171A. Alternatively, the position of the user may be inputted by the user instead of being measured by the positioning sensor 124.

It should be noted that while FIG. 1 illustrates a case where the information processing apparatus 100 is a smartphone, a type of the information processing apparatus 100 is not particularly limited. For example, the information processing apparatus 100 may be a video camera, a tablet terminal or personal digital assistants (PDA). Alternatively, the information processing apparatus 100 may be a personal computer (PC), a mobile phone, a mobile music playback apparatus, a mobile video processing apparatus, or mobile game equipment.

When the user inputs destination, the information processing apparatus 100 can calculate azimuth of route L1 from the position of the user to the destination based on the map information 171A. Further, as illustrated in FIG. 1, the information processing apparatus 100 can cause the azimuth of the route L1 to be displayed at the display unit 170. Here, the user may wish to recognize azimuth of himself/herself.

Therefore, as illustrated in FIG. 1, the user has a magnetic sensor 121. The magnetic sensor 121 can measure magnetism including geomagnetism. The information processing apparatus 100 can specify azimuth of the magnetic sensor 121 based on a magnetic value measured by the magnetic sensor 121. The information processing apparatus 100 can cause the azimuth of the magnetic sensor 121 to be displayed at the display unit 170. The user expects that he/she can reach the destination by moving while adapting the azimuth of the magnetic sensor 121 to the azimuth of the route L1.

However, because the magnetism measured by the magnetic sensor 121 can include magnetism which becomes disturbance of the geomagnetism, a measurement error can occur in the measurement of the geomagnetism by the magnetic sensor 121. Hereinafter, the magnetism which becomes disturbance of the geomagnetism will be also referred to as disturbing magnetism. An azimuth error can occur in the azimuth of the magnetic sensor 121 specified based on the magnetic value including the measurement error. If the user proceeds according to the azimuth of the magnetic sensor 121 which includes the azimuth error, there is a possibility that the user cannot reach the destination.

FIG. 1 illustrates a trajectory Q11 of the user position in the case where the user proceeds while adapting the azimuth of the magnetic sensor 121 to the azimuth of the route L1. Referring to the trajectory Q11 of the user position, it can be recognized that the user reaches a position P11 which deviates from the route L1 to the destination from an initial position P10. Therefore, it is useful to recognize a measurement error as the geomagnetic sensor of the magnetic sensor 121. In the present specification, a technique which enables a measurement error to be obtained with higher accuracy as the geomagnetic sensor of the magnetic sensor 121 will be proposed.

The outline of the information processing apparatus 100 according to the embodiment of the present disclosure has been described above.

2. Details of Information Processing Apparatus

Subsequently, details of the information processing apparatus 100 according to the embodiment of the present disclosure will be described.

<2-1. Example of Functional Configuration of Information Processing Apparatus>

Figure 2:
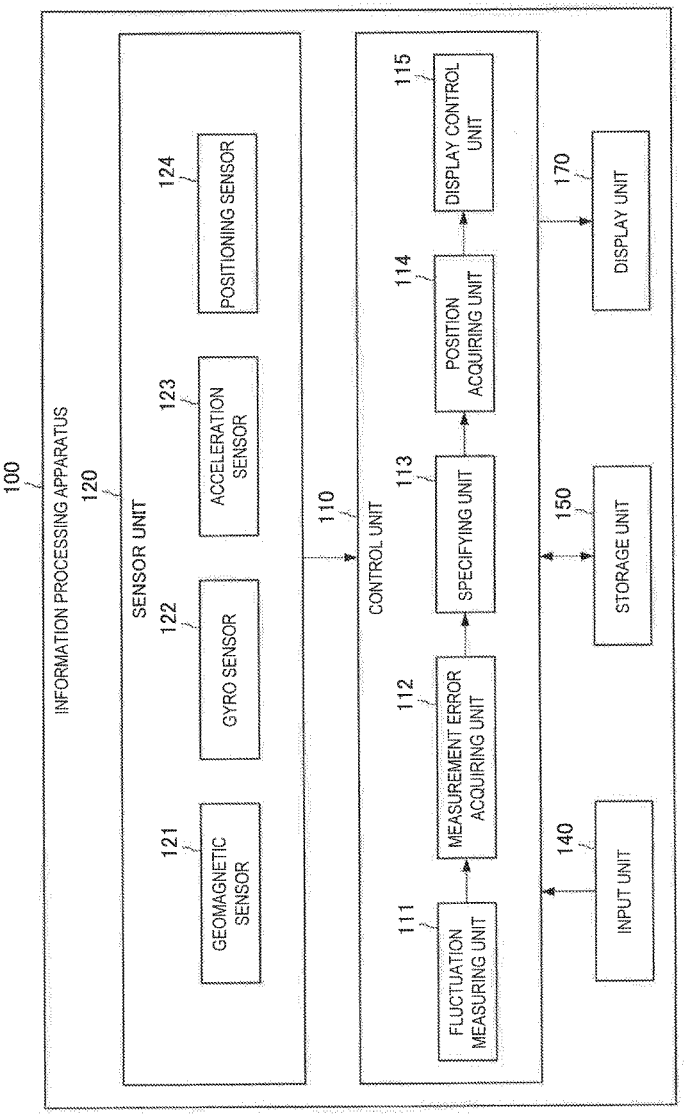
FIG. 2 is a diagram illustrating an example of a functional configuration of the information processing apparatus according to the embodiment of the present disclosure.

First, an example of a functional configuration of the information processing apparatus 100 according to the embodiment of the present disclosure will be described. FIG. 2 is a diagram illustrating the example of the functional configuration of the information processing apparatus 100 according to the embodiment of the present disclosure. As illustrated in FIG. 2, the information processing apparatus 100 includes a control unit 110, a sensor unit 120, an input unit 140, a storage unit 150 and a display unit 170.

The control unit 110 corresponds to, for example a processor such as a central processing unit (CPU). The control unit 110 implements various functions of the control unit 110 by executing a program stored in the storage unit 150 or other storage media. The control unit 110 has a fluctuation measuring unit 111, a measurement error acquiring unit 112, a specifying unit 113, a position acquiring unit 114 and a display control unit 115. Each of these functional units of the control unit 110 will be described later.

The sensor unit 120 detects predetermined sensor data and outputs the sensor data to the control unit 110. In the example illustrated in FIG. 2, the sensor unit 120 has a magnetic sensor 121, a gyro sensor 122, an acceleration sensor 123 and a positioning sensor 124. The magnetic sensor 121 is a sensor for measuring a magnetic value, the gyro sensor 122 is a sensor for measuring angular velocity, and the acceleration sensor 123 is a sensor for measuring acceleration. While, in the following description, a case where the magnetic sensor 121, the gyro sensor 122 and the acceleration sensor 123 are triaxial sensors will be mainly described, the types of the magnetic sensor 121, the gyro sensor 122 and the acceleration sensor 123 are not particularly limited, and the sensors may be biaxial sensors.

The positioning sensor 124 is a sensor for detecting a position. The way how the position is expressed is not particularly limited, and the position may be expressed using longitude and latitude. While the positioning sensor 124 may have a global positioning system (GPS) antenna and detect a position calculated using a GPS signal received by the GPS antenna, the type of the positioning sensor 124 is not particularly limited. For example, the positioning sensor 124 may have an antenna receiving a radio signal from the base station and detect a position calculated using the radio signal received by the antenna. While, in the example illustrated in FIG. 2, the sensor unit 120 is incorporated into the information processing apparatus 100, part or all of the sensor unit 120 may exist outside the information processing apparatus 100.

The input unit 140 has a function for accepting operation from the user. The input unit 140 outputs the operation accepted from the user to the control unit 110. The operation can be used for execution of a program. For example, the input unit 140 can accept operation for starting activation of the program from the user. Further, for example, the input unit 140 can accept operation for terminating execution of the program from the user. While, in the example illustrated in FIG. 2, the input unit 140 is incorporated into the information processing apparatus 100, the input unit 140 may exist outside the information processing apparatus 100.

The storage unit 150 stores a program for making the control unit 110 operate using a storage medium such as a semiconductor memory and a hard disc. Further, for example, the storage unit 150 can also store various kinds of data (such as, for example, various kinds of setting information and content) used by the program. It should be noted that while, in the example illustrated in FIG. 2, the storage unit 150 is incorporated into the information processing apparatus 100, the storage unit 150 may exist outside the information processing apparatus 100.

The display unit 170 displays various kinds of information according to control by the control unit 110. For example, the display unit 170 may be a liquid crystal display (LCD) or an organic electroluminescence (EL) display. Alternatively, the display unit 170 may include a sound output apparatus such as a speaker and a headphone. It should be noted that while, in the example illustrated in FIG. 2, the display unit 170 is incorporated into the information processing apparatus 100, the display unit 170 may exist outside the information processing apparatus 100.

The example of the functional configuration of the information processing apparatus 100 according to the embodiment of the present disclosure has been described above.

<2-2. Calculation of Measurement Error>

Figure 3:
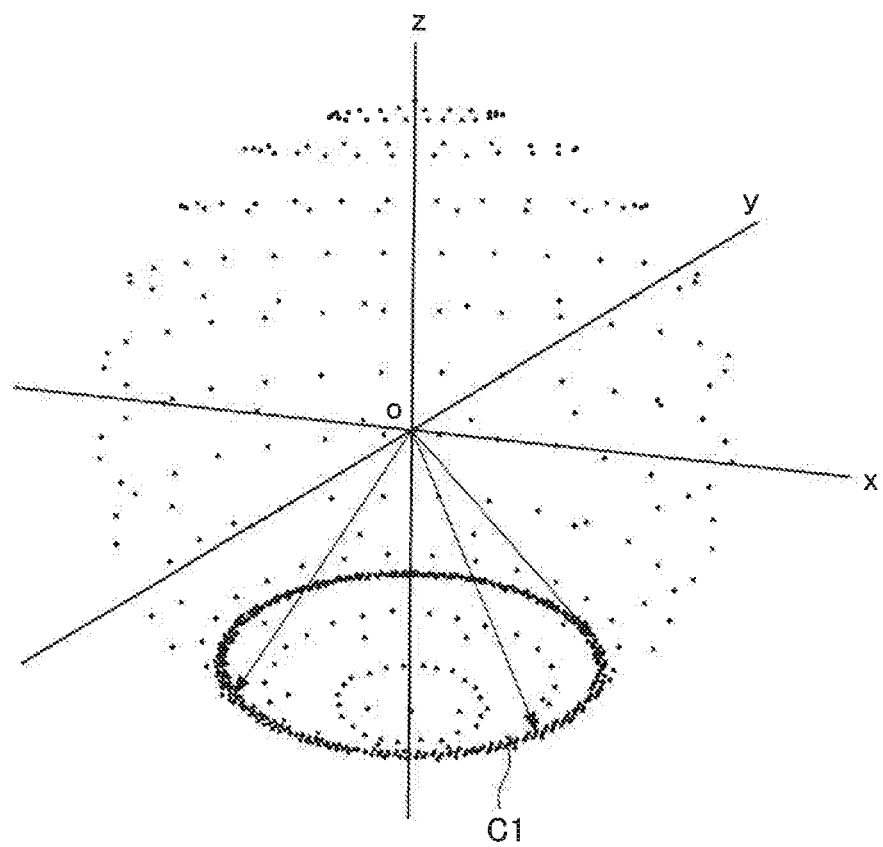
FIG. 3 is a diagram for explaining a measurement error obtained by the information processing apparatus according to the embodiment of the present disclosure.

As described above, a measurement error can occur in measurement of geomagnetism by the magnetic sensor 121. In the following description, the measurement error obtained by the information processing apparatus 100 according to the embodiment of the present disclosure will be described. FIG. 3 is a diagram for explaining a measurement error obtained by the information processing apparatus 100 according to the embodiment of the present disclosure. Specifically, FIG. 3 illustrates an example of results in which measured magnetic values are plotted on three axes.

For example, a typical technique is assumed in which registration information in which measurement positions, depression of geomagnetism and absolute values of geomagnetism are associated is prepared as a database, and a measurement error as a geomagnetic sensor is obtained based on a comparison result of the registration information and actual measured information. In such a typical technique, when the depression and the absolute values are not similar between the registration information and the actual measured information, it can be estimated that there is a higher measurement error.

On the other hand, in such a typical technique, when the depression and the absolute values are the same or similar between the registration information and the actual measured information, it is difficult to estimate a measurement error, because, first, even if the depression and the absolute values are the same between the registration information and the actual measured information, it can be only recognized that a point indicating the measured magnetic value is located on any point on a circle C1, and there is a possibility that azimuth or posture is different between the registration information and the actual measured information, and, secondly, it is difficult to recognize a degree of influence of disturbance.

In the present specification, a method for obtaining a measurement error based on temporal fluctuation of the magnetic value or the information obtained based on the magnetic value is proposed. The magnetic value may be an absolute value of the magnetic value (magnitude of a magnetic vector) or an axial component of any of the magnetic value. Further, the information obtained based on the magnetic value may be depression obtained from the magnetic value, an absolute value of the magnetic value, azimuth obtained from the magnetic value or posture obtained from the magnetic value. According to this method, it is possible to obtain a measurement error with higher accuracy by also reflecting information other than the depression and the absolute value on the measurement error. Further, according to this method, it is not necessary to prepare the registration information in advance.

Further, in the present specification, a method for measuring a magnetic value during movement of at least the magnetic sensor 121 is proposed. According 6 to this method, spatial magnetic distribution measured during movement of the magnetic sensor 121 is reflected on the measurement error. It is estimated that there is high correlation between the spatial magnetic distribution and the measurement error. Therefore, according to this method, it is possible to obtain a measurement error with higher accuracy.

Figure 4:
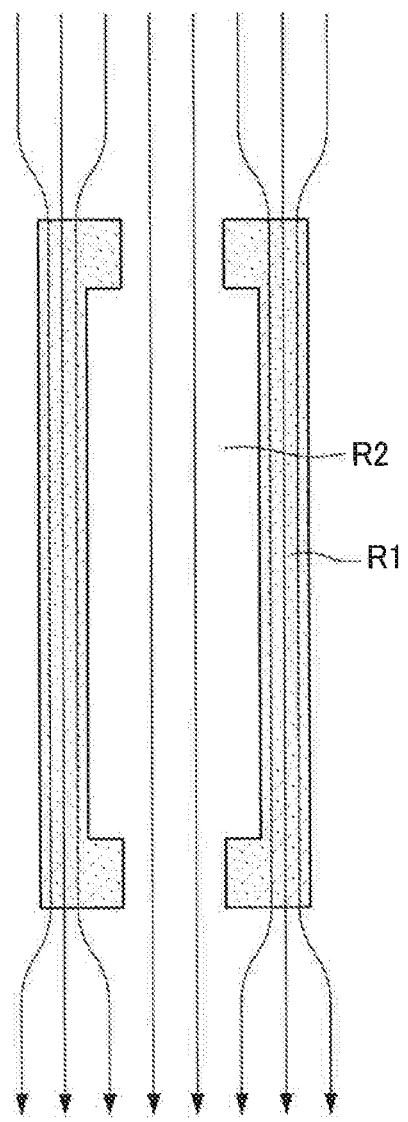
FIG. 4 is another diagram for explaining the measurement error obtained by the information processing apparatus according to the embodiment of the present disclosure.

FIG. 4 is another diagram for explaining the measurement error obtained by the information processing apparatus 100 according to the embodiment of the present disclosure. Referring to FIG. 4, a region R1 of a building made of iron and steel exists, and a region R2 surrounded by the region R1 exists. Here, while, in the region R2, a magnetic flux is likely to be sparse compared to in the region R1, which can make an absolute value of the magnetic value small, there is also a possibility that an absolute value of geomagnetism registered in the region R2 is at the same level as an absolute value of geomagnetism registered in the region R1 according to accuracy of the registration information. Therefore, in the above-described typical technique, even if it is judged that the absolute values are not similar between the registration information and the actual measured information in the region R2 and an azimuth error is not so high, it can be estimated that there is a high measurement error.

In the present specification, a method for obtaining a measurement error based on temporal fluctuation of the magnetic value or the information obtained based on the magnetic value is proposed. According to this method, because it is not necessary to compare between the actual measured information and the registration information, it is possible to obtain a measurement error with higher accuracy which does not depend on a level of accuracy of the registration information.

Further, in the present specification, a method for obtaining a magnetic value during movement of at least the magnetic sensor 121 is proposed. According to this method, spatial magnetic distribution measured during movement of the magnetic sensor 121 is reflected on the measurement error. In the region R2 where the magnetic flux is likely to be sparse, when the azimuth error is not so high, there is a possibility that the spatial magnetic distribution does not change largely, and there is a possibility that a lower measurement error can be obtained with higher accuracy compared to the above-described typical technique.

Subsequently, the method for obtaining the measurement error by the information processing apparatus 100 according to the embodiment of the present disclosure will be described in further details. First, the fluctuation measuring unit 111 measures temporal fluctuation of the magnetic value measured by the magnetic sensor 121 during movement of at least the magnetic sensor 121 or the information obtained based on the magnetic value. The measurement error acquiring unit 112 obtains a measurement error as the geomagnetic sensor of the magnetic sensor 121 based on the fluctuation measured by the fluctuation measuring unit 111. According to this method, it is possible to obtain a measurement error with higher accuracy as described above.

Whether or not the magnetic sensor 121 is moving may be automatically judged by the control unit 110 or may be inputted by the user. Whether or not the magnetic sensor 121 is moving may be judged in any way, and may be judged based on sensor data measured by the sensor unit 120. For example, the control unit 110 may judge that the magnetic sensor 121 is moving when the positioning position measured by the positioning sensor 124 changes or may judge whether or not the magnetic sensor 121 is moving using a pedometer. It should be noted that the fluctuation measuring unit 111 may measure fluctuation while the magnetic sensor 121 is stopped.

Various measuring methods are assumed as measurement of fluctuation by the fluctuation measuring unit 111. For example, the fluctuation measuring unit 111 sets two predetermined measurement time as first measurement time and second measurement time, and may measure, as fluctuation, a difference value between the magnetic values or information obtained based on the magnetic values at the first measurement time and the second measurement time. By measuring the difference value as fluctuation in this manner, it is possible to measure fluctuation using simple processing.

While the first measurement time and the second measurement time may be any time, for example, among the magnetic values measured within a predetermined time period or information obtained based on the magnetic values, the first measurement time may be a maximum value and the second measurement time may be a minimum value.

In the following description, a case where the first measurement time is a maximum value and the second measurement time is a minimum value will be described with reference to FIG. 5 and FIG. 6. While FIG. 5 and FIG. 6 illustrate a case where the predetermined time period is 10 seconds, the length of the predetermined time period is not limited.

It should be noted that while, in the following description, a case where an azimuth error is used as an example of the measurement error will be mainly described assuming that the measurement error is used to specify azimuth, the measurement error may be used for purposes other than specification of the azimuth. Further, while, in the following description, a case will be mainly described where the fluctuation measuring unit 111 measures temporal fluctuation of the magnetic value measured by the magnetic sensor 121, the fluctuation measuring unit 111 may measure temporal fluctuation of the information obtained based on the magnetic value.

Figure 5:
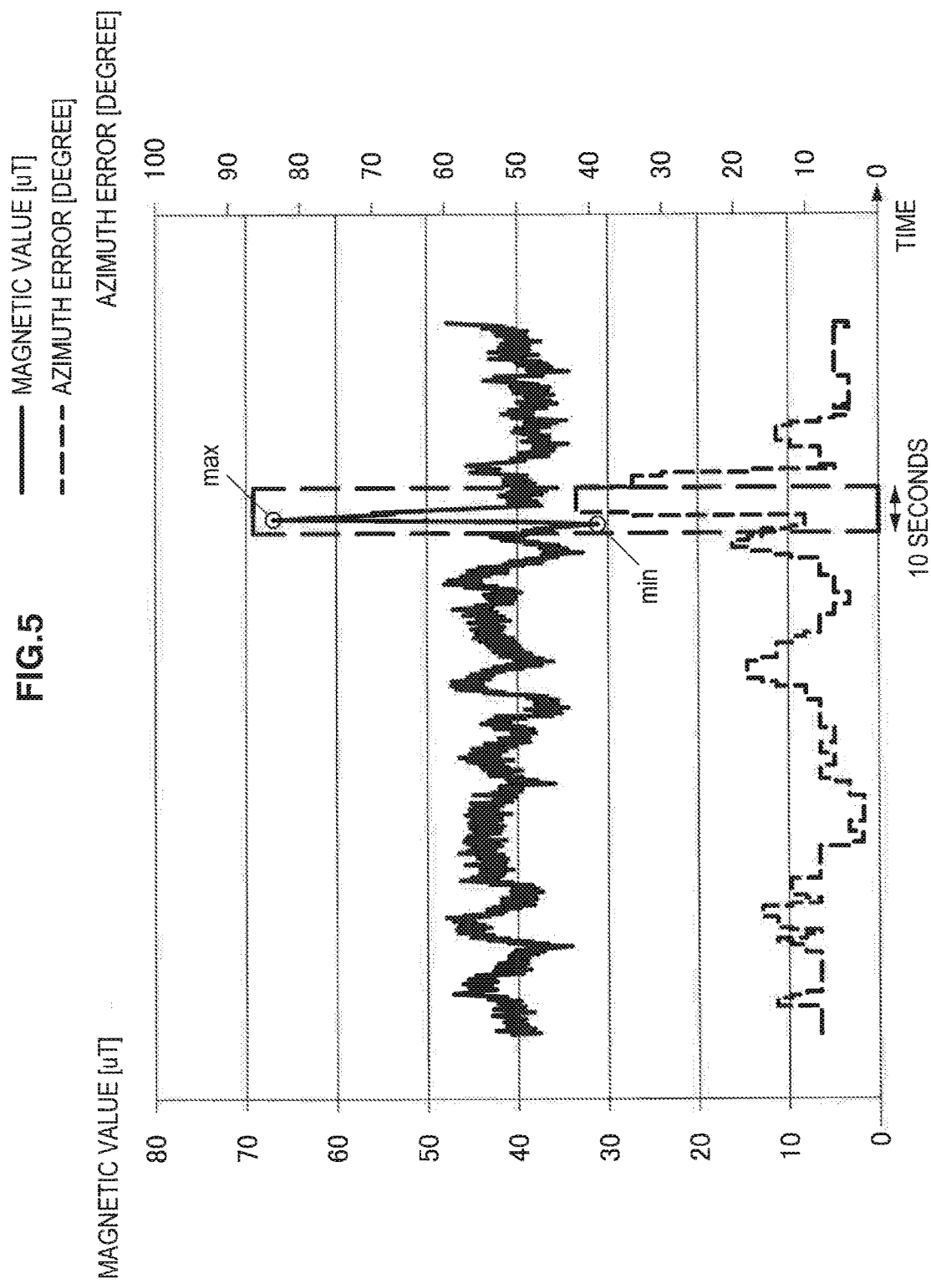
FIG. 5 is a diagram illustrating one example of relationship between a magnetic value and an azimuth error.
Figure 6:
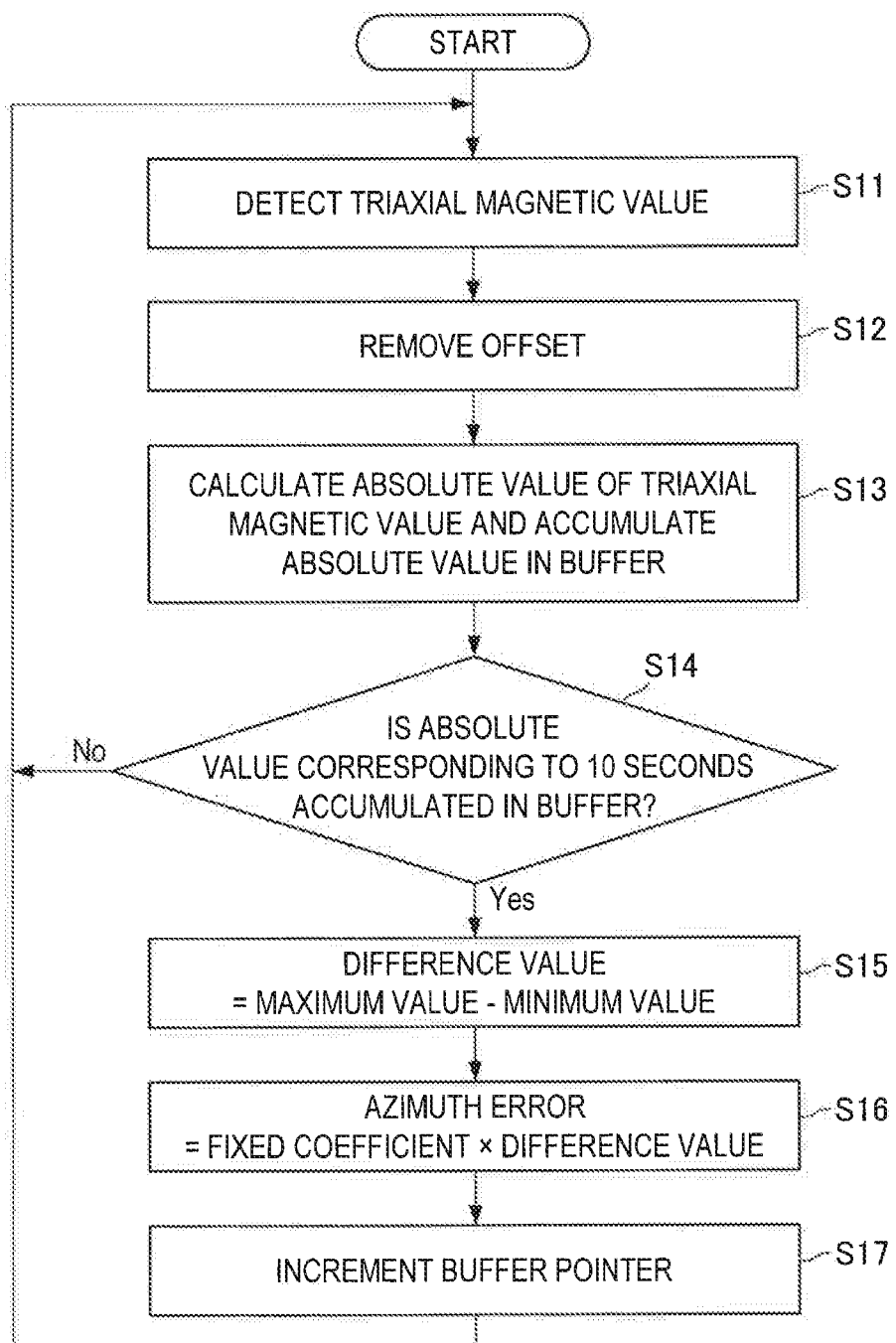
FIG. 6 is a flowchart illustrating one example of operation for obtaining the azimuth error based on the magnetic value.

FIG. 5 is a diagram illustrating one example of relationship between the absolute value of the magnetic value and the azimuth error. Further, FIG. 6 is a flowchart illustrating one example of operation for obtaining the azimuth error based on the magnetic value. First, the magnetic sensor 121 detects a triaxial magnetic value (S11), and removes offset from the detected triaxial magnetic value (S12). The fluctuation measuring unit 111 calculates an absolute value of the triaxial magnetic value and accumulates the absolute value in a buffer (S13). The absolute value of the triaxial magnetic value can change as illustrated in FIG. 5. The control unit 110 shifts the operation to S11 when absolute values corresponding to 10 seconds are not accumulated in the buffer (S14: "No").

On the other hand, when the absolute values corresponding to 10 seconds are accumulated in the buffer (S14: "Yes"), the measurement error acquiring unit 112 calculates a difference value by subtracting the minimum value from the maximum value among the absolute values corresponding to 10 seconds accumulated in the buffer (S15), and calculates an azimuth error by multiplying the difference value by a fixed coefficient (S16). FIG. 5 illustrates the maximum value and the minimum value among the absolute values corresponding to 10 seconds accumulated in the buffer. The control unit 110 increments a buffer pointer indicating an accumulation position of an absolute value of triaxial geomagnetism (S17) and shifts the operation to S11.

It should be noted that while an example where the first measurement time is the maximum value and the second measurement time is the minimum value among the magnetic values measured within a predetermined time period or the information obtained based on the magnetic values has been described here, as described above, the first measurement time and the second measurement time may be any time. For example, the first measurement time and the second measurement time have an interval of a predetermined time period therebetween.

In the following description, a case will be described with reference to FIG. 7 where the first measurement time and the second measurement time have an interval of a predetermined time period therebetween. While FIG. 7 illustrates a case where the predetermined time period is 1 second, the length of the predetermined time period is not limited.

Figure 7:
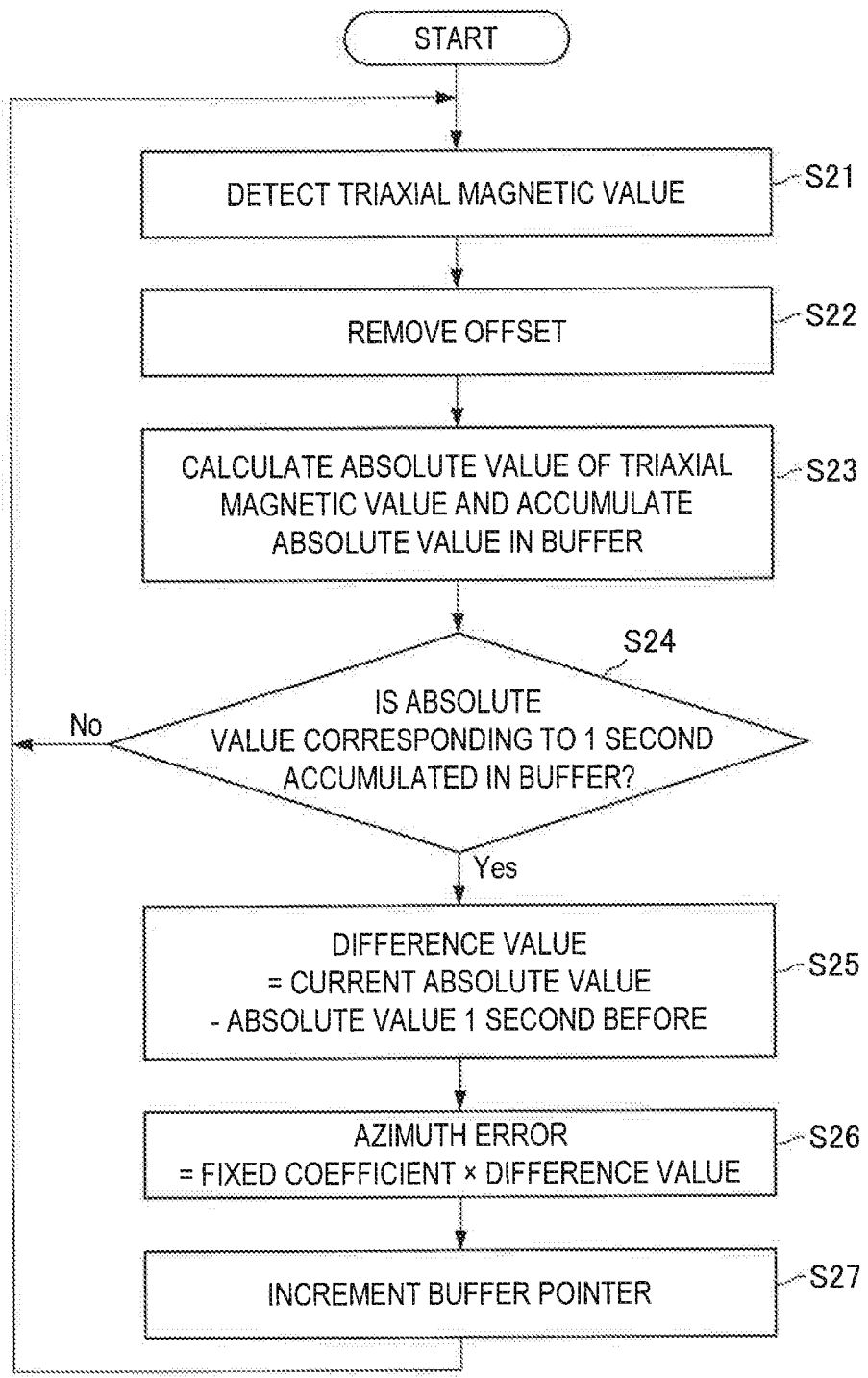
FIG. 7 is a flowchart illustrating another example of the operation for obtaining the azimuth error based on the magnetic value.

FIG. 7 is a flowchart illustrating another example of the operation for obtaining the azimuth error based on the magnetic value. First, the magnetic sensor 121 detects a triaxial magnetic value (S21), and removes offset from the detected triaxial magnetic value (S22). The fluctuation measuring unit 111 calculates an absolute value of the triaxial magnetic value and accumulates the absolute value in the buffer (S23). When absolute values corresponding to 1 second are not accumulated in the buffer (S24: "No"), the control unit 110 shifts the operation to S21.

On the other hand, when absolute values corresponding to 1 second are accumulated in the buffer (S24: "Yes"), the measurement error acquiring unit 112 calculates a difference value by subtracting an absolute value 1 second before from a current absolute value among the absolute values corresponding to 1 second accumulated in the buffer (S25), and calculates an azimuth error by multiplying the difference value by a fixed coefficient (S26). The control unit 110 increments a buffer pointer indicating an accumulation position of the absolute value of the triaxial geomagnetism (S27) and shifts the operation to S21.

It should be noted that while FIG. 6 and FIG. 7 illustrate an example where the measurement error acquiring unit 112 calculates a result of multiplication of the difference value and the fixed coefficient as the azimuth error of the magnetic sensor 121, a method for calculating the azimuth error is not limited to this example. For example, the measurement error acquiring unit 112 may obtain a difference value itself as the azimuth error of the magnetic sensor 121. Therefore, the measurement error acquiring unit 112 may obtain the result of multiplication of the difference value and the fixed coefficient or the difference value as the measurement error of the magnetic sensor 121.

The measurement error obtained by the information processing apparatus 100 according to the embodiment of the present disclosure has been described above.

<2-3. Specification of Azimuth or Posture>

Figure 8:
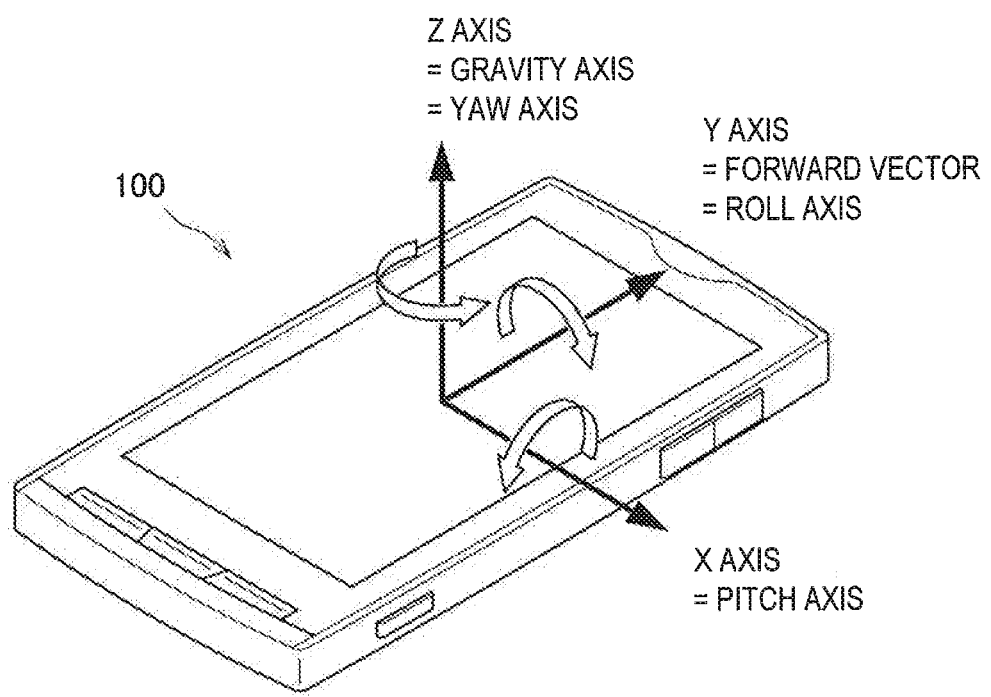
FIG. 8 is a diagram for explaining a yaw axis, a roll axis and a pitch axis.

The measurement error obtained as described above may be utilized in any way. For example, the specifying unit 113 may specify azimuth or posture based on the measurement error of the magnetic sensor 121. First, a yaw angle, a roll angle and a pitch angle will be described as posture angles of the magnetic sensor 121 to be used to specify the azimuth or the posture of the magnetic sensor 121. FIG. 8 is a diagram for explaining the yaw angle, the roll angle and the pitch angle.

As illustrated in FIG. 8, a roll axis (Y axis) may be set along a forward vector of the information processing apparatus 100. Further, a pitch axis (X axis) may be set along a horizontal direction of the information processing apparatus 100. A yaw axis (Z axis) may be set along a gravity vector. In the following description, the pitch angle, the roll angle and the yaw angle respectively correspond to rotation angles with respect to the pitch axis, the roll axis and the yaw axis. Further, the yaw angle can correspond to the azimuth, and the pitch angle and the roll angle can correspond to the posture.

While a method for specifying the azimuth or the posture based on the measurement error of the magnetic sensor 121 is not particularly limited, the specifying unit 113 may increase weight of correction to the azimuth or the posture using other sensor data as the measurement error of the magnetic sensor 121 is higher. According to this configuration, it is possible to specify the azimuth or the posture with higher accuracy. A method for increasing weight of correction to the azimuth or the posture using other sensor data is not particularly limited.

For example, the specifying unit 113 may correct the azimuth or the posture based on the other sensor data when the measurement error of the magnetic sensor 121 exceeds a threshold. While the other sensor data is not particularly limited, the other sensor data may be angular velocity measured by the gyro sensor 122. Therefore, the specifying unit 113 may correct the azimuth or the posture based on the angular velocity measured by the gyro sensor 122 when the measurement error of the magnetic sensor 121 exceeds the threshold. This correction will be further specifically described.

Figure 9:
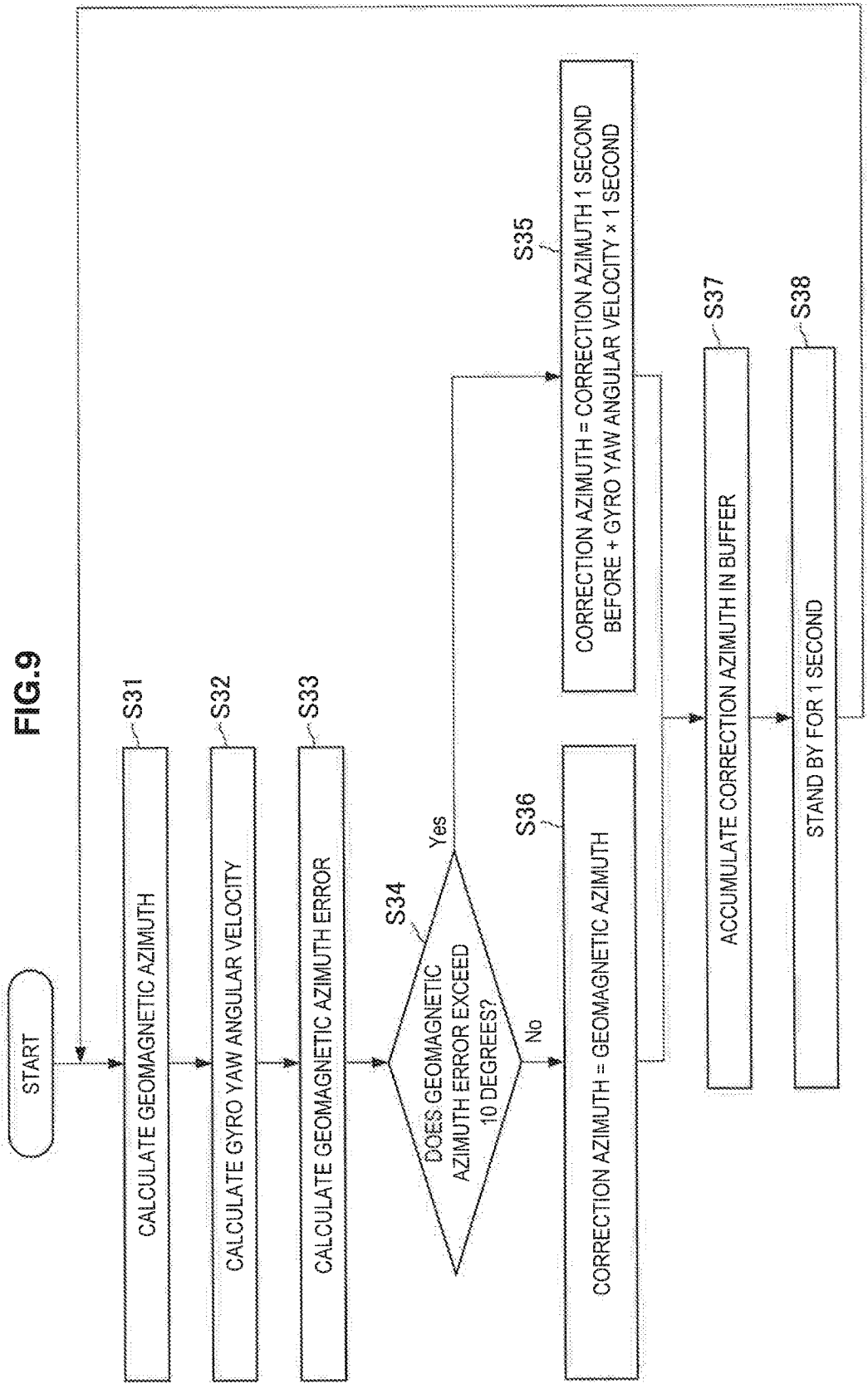
FIG. 9 is a flowchart illustrating one example of operation for specifying azimuth based on the azimuth error.

FIG. 9 is a flowchart illustrating one example of the operation for specifying the azimuth based on the azimuth error. First, the control unit 110 calculates the azimuth based on the magnetic value detected by the magnetic sensor 121 (hereinafter, also referred to as "geomagnetic azimuth") (S31). Further, the control unit 110 calculates yaw angular velocity based on the angular velocity detected by the gyro sensor 122 (hereinafter, also referred to as "gyro yaw angular velocity") (S32). A direction of the yaw axis may be determined based on a gravity vector estimated from the acceleration detected by the acceleration sensor 123.

Subsequently, the fluctuation measuring unit 111 measures temporal fluctuation of the magnetic value measured by the magnetic sensor 121 during movement of at least the magnetic sensor 121 or the information obtained based on the magnetic value, and the measurement error acquiring unit 112 calculates a measurement error as the geomagnetic sensor of the magnetic sensor 121 (hereinafter, also referred to as a "geomagnetic azimuth error") based on the fluctuation measured by the fluctuation measuring unit 11 (S33).

When the geomagnetic azimuth error exceeds 10° (S34: "Yes"), the specifying unit 113 calculates new correction azimuth by adding a result of multiplication of the gyro yaw angular velocity and 1 second to the correction azimuth 1 second before (S35), and the operation is shifted to S37. On the other hand, when the geomagnetic azimuth error falls below 10° (S34: "No"), the specifying unit 113 sets the geomagnetic azimuth as new correction azimuth (S36), and the operation is shifted to S37. When the geomagnetic azimuth error is equal to 10°, the operation may be shifted to either S35 or S36.

The specifying unit 113 accumulates the correction azimuth in the buffer (S37), and the control unit 110 stands by for 1 second (S38) and shifts the operation to S31. It should be noted that while FIG. 9 illustrates a case where the threshold to be compared with the geomagnetic azimuth error is 10°, a magnitude of the threshold is not limited. Further, while FIG. 9 illustrates a case where the azimuth is corrected for each 1 second, a time interval for correcting the azimuth is not limited and may be changed as appropriate.

While an example has been described above where the azimuth or the posture is specified based on the measurement error of the magnetic sensor 121, the specifying unit 113 may specify the azimuth or the posture based on the measurement error of the magnetic sensor 121 and a measurement error of another sensor. A method for specifying the azimuth or the posture based on the measurement error of the magnetic sensor 121 and the measurement error of another sensor is not particularly limited.

For example, the specifying unit 113 may correct the azimuth or the posture based on the sensor data measured by another sensor when the measurement error of the magnetic sensor 121 exceeds the measurement error of another sensor. According to this configuration, it is possible to specify the azimuth or the posture with higher accuracy. Another sensor is not particularly limited, and may be the gyro sensor 122. Therefore, the specifying unit 113 may correct the azimuth or the posture based on the angular velocity measured by the gyro sensor 122 when the measurement error of the magnetic sensor 121 exceeds the measurement error of the gyro sensor 122. This correction will be further specifically described.

Figure 10:
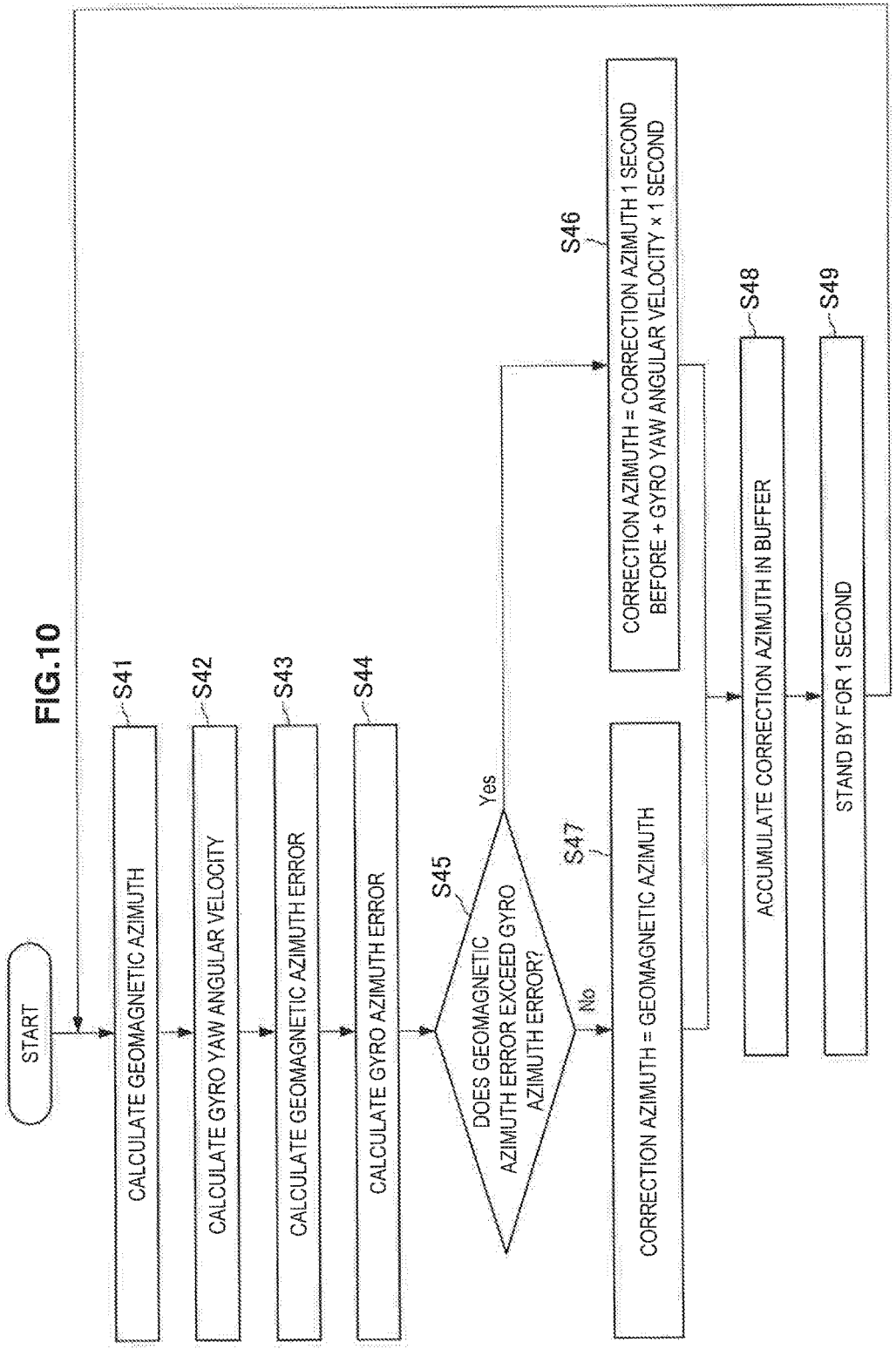
FIG. 10 is a flowchart illustrating another example of the operation for specifying the azimuth based on the azimuth error.

FIG. 10 is a flowchart illustrating another example of the operation for specifying the azimuth based on the azimuth error. First, the control unit 110 calculates geomagnetic azimuth (S41). Further, the control unit 110 calculates gyro yaw angular velocity (S42). A direction of the yaw axis may be determined based on the gravity vector estimated from the acceleration detected by the acceleration sensor 123. Subsequently, the fluctuation measuring unit 111 measures temporal fluctuation of the magnetic value measured by the magnetic sensor 121 during movement of at least the magnetic sensor 121 or the information obtained based on the magnetic value, and the measurement error acquiring unit 112 calculates a geomagnetic azimuth error based on the fluctuation measured by the fluctuation measuring unit 111 (S43).

The measurement error acquiring unit 112 calculates a measurement error of the gyro sensor 122 (hereinafter, also referred to as a "gyro azimuth error") (S44). While a method for calculating the measurement error of the gyro sensor 122 is not particularly limited, it is also possible to calculate elapsed time from a time point at which offset correction is performed on the gyro sensor 122 last time as the measurement error of the gyro sensor 122 taking into account characteristics that the measurement error of the gyro sensor 122 becomes longer for longer elapsed time from the time point at which offset correction is performed.

When the geomagnetic azimuth error exceeds the gyro azimuth error (S45: "Yes"), the specifying unit 113 calculates new correction azimuth by adding a result of multiplication of the gyro yaw angular velocity and 1 second to the correction azimuth 1 second before (S46), and the operation is shifted to S48. On the other hand, when the geomagnetic azimuth error falls below the gyro azimuth error (S45: "No"), the specifying unit 113 sets the geomagnetic azimuth as new correction azimuth (S47), and the control unit 110 shifts the operation to S48. When the geomagnetic azimuth error is equal to the gyro azimuth error, the operation may be shifted to either S46 or S47.

The specifying unit 113 accumulates the correction azimuth in the buffer (S48), and the control unit 110 stands by for 1 second (S49) and shifts the operation to S41. It should be noted that while FIG. 10 illustrates a case where the azimuth is corrected for each 1 second, a time interval for correcting the azimuth is not limited and may be changed as appropriate.

Figure 11:
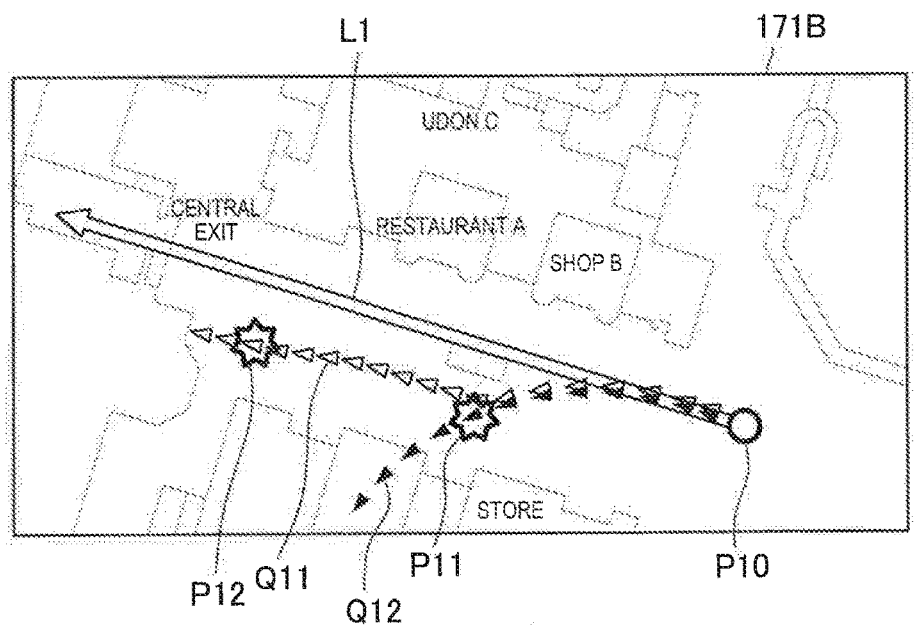
FIG. 11 is a diagram illustrating one example of trajectories of a user position in the case where the information processing apparatus according to the embodiment of the present disclosure and a typical technique are respectively used.

FIG. 11 is a diagram illustrating one example of trajectories of a user position in the case where the information processing apparatus 100 according to the embodiment of the present disclosure and a typical technique are respectively used. One example of a difference of trajectories of the user position in the case where the information processing apparatus 100 according to the embodiment of the present disclosure and the typical technique are respectively used will be described with reference to FIG. 11. The trajectories of the user position are indicated in map information 171B.

Specifically, a trajectory Q11 of the user position indicates a trajectory in the case where the azimuth is specified using the measurement error obtained by the fluctuation measuring unit 111 and the measurement error acquiring unit 112 based on a comparison result between the geomagnetic azimuth error and the gyro azimuth error as illustrated in FIG. 10. Meanwhile, a trajectory Q12 of the user position is a trajectory in the case where the azimuth is specified using the measurement error obtained using the above-described typical technique based on the comparison result between the geomagnetic azimuth error and the gyro azimuth error as illustrated in FIG. 10.

Here, a magnitude of the geomagnetism typically tends to be weaker indoors than outdoors. For example, when the typical technique in which registration information and actual measured information are compared is used in a situation where the user moves indoors, an absolute value of the magnetic value is likely to be small, and the geomagnetic azimuth error is likely to be large. As a result, the geomagnetic azimuth error is likely to exceed the gyro azimuth error, and thus the azimuth is likely to be specified based on the angular velocity measured by the gyro sensor. However, because the measurement result of the gyro sensor includes an offset error, if the angular velocity measured by the gyro sensor is accumulated, the measurement error becomes gradually larger as indicated with the trajectory Q12.

On the other hand, for example, when the measurement error obtained by the fluctuation measuring unit 111 and the measurement error acquiring unit 112 is used in the same situation, because the geomagnetic azimuth error does not become so large, the geomagnetic azimuth error falls below the gyro azimuth error at a time point at which the user reaches the position P11. When the user reaches the positions P11 and P12, because the azimuth is specified based on the magnetic value measured by the magnetic sensor 121, it can be recognized that the trajectory Q11 of the user position does not deviate from the route L1 too far.

Figure 12:
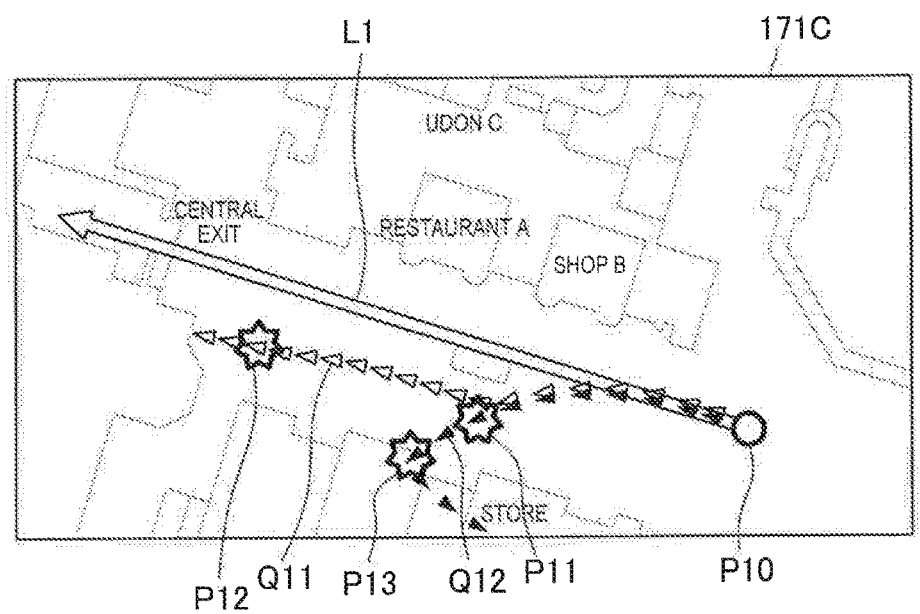
FIG. 12 is a diagram illustrating another example of the trajectories of the user position in the case where the information processing apparatus according to the embodiment of the present disclosure and the typical technique are respectively used.

FIG. 12 is a diagram illustrating another example of the trajectories of the user position in the case where the information processing apparatus 100 according to the embodiment of the present disclosure and the typical technique are respectively used. Another example of the difference of the trajectories of the user position in the case where the information processing apparatus 100 according to the embodiment of the present disclosure and the typical technique are respectively used will be described with reference to FIG. 12. The trajectories of the user position are indicated in map information 171C.

Also in FIG. 12, the trajectories Q1 and Q12 of the user position are indicated. For example, when the typical technique in which the registration information and the actual measured information are compared is used in a situation where the user moves indoors, the measurement error gradually becomes larger as indicated with the trajectory Q12. Here, as described above, even when the depression and the absolute value are the same or similar between the registration information and the actual measured information, when the depression and the absolute value are the same between the registration and the actual measured information, although the geomagnetic azimuth error is likely to be estimated to be low, there is a possibility that the azimuth is different between the registration and the actual measured information.

It is assumed that the geomagnetic azimuth error falls below the gyro azimuth error at the time point at which the user reaches a position P13. When the user reaches the position P13, while the azimuth is specified based on the magnetic value measured by the magnetic sensor 121, it can be recognized that because the measured azimuth is actually not correct, the trajectory Q12 of the user position further largely deviates from the route L1 after the user reaches the position P13.

Figure 13:
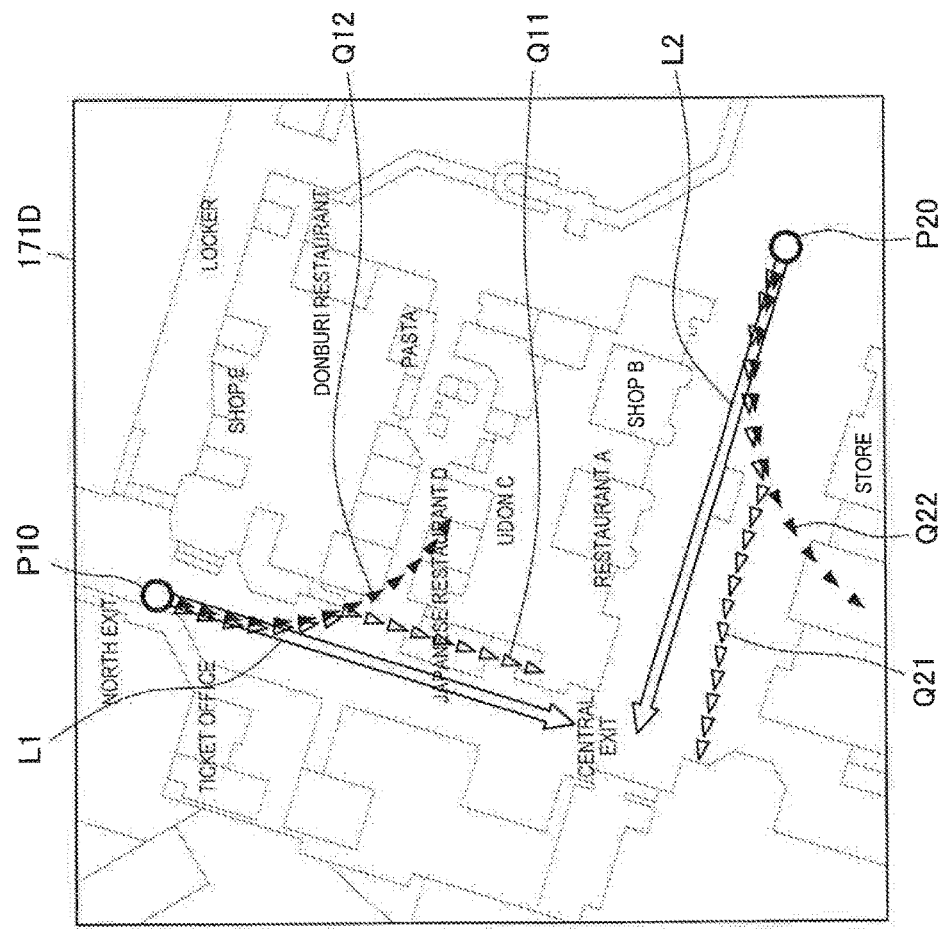
FIG. 13 is a diagram illustrating one example of trajectories of a plurality of user positions in the case where the information processing apparatus according to the embodiment of the present disclosure and the typical technique are respectively used.

FIG. 13 is a diagram illustrating one example of trajectories of a plurality of user positions in the case where the information processing apparatus 100 according to the embodiment of the present disclosure and the typical technique are respectively used. One example of trajectories of the plurality of user positions in the case where the information processing apparatus 100 according to the embodiment of the present disclosure and the typical technique are respectively used will be described with reference to FIG. 13. Trajectories of a first user position and a second user position are respectively indicated in map information 171D. The first user tries to move in the azimuth of the route L1 from an initial position P10, and the second user tries to move in the azimuth of the route L2 from an initial position P20.

Specifically, a trajectory Q11 of the first user position and a trajectory Q21 of the second user position indicate trajectories in the case where the azimuth is specified based on a result of comparison between the geomagnetic azimuth error and the gyro azimuth error as illustrated in FIG. 10 using the measurement error obtained by the fluctuation measuring unit 111 and the measurement error acquiring unit 112. Meanwhile, a trajectory Q12 of the first user position and a trajectory Q22 of the second user position indicate trajectories in the case where the azimuth is specified based on a result of comparison between the geomagnetic azimuth error and the gyro azimuth error as illustrated in FIG. 10 using the measurement error obtained using the above-described typical technique.

It can be recognized from the trajectory Q12 of the first user position and the trajectory Q22 of the second user position in the case where the typical technique is used that the first user and the second user move away from a junction point of the route L1 and the route L2. On the other hand, it can be recognized from the trajectory Q11 of the first user position and the trajectory Q21 of the second user position in the case where the information processing apparatus 100 according to the embodiment of the present disclosure is used that the first user and the second user approaches the junction point of the route L1 and the route L2.

Figure 14:
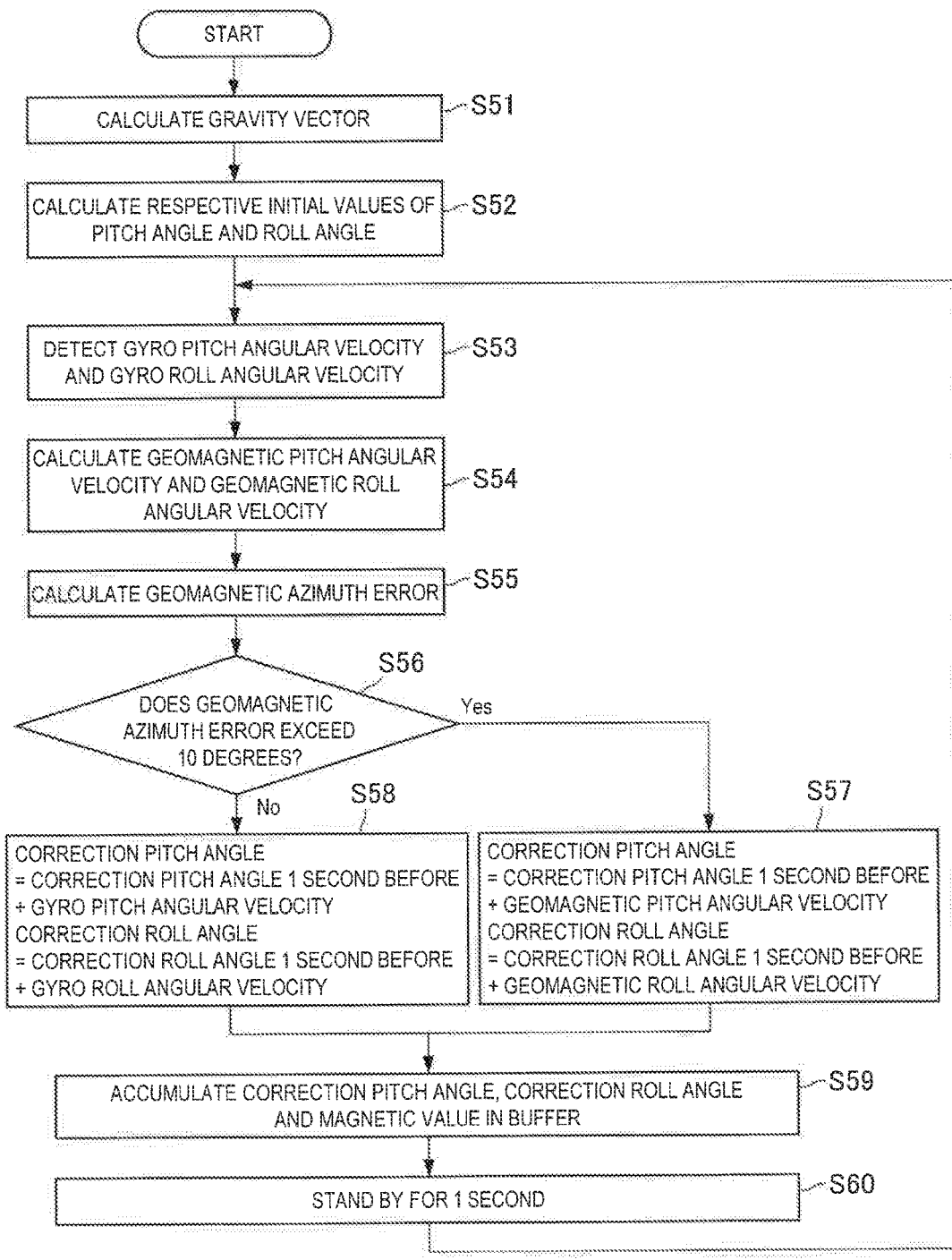
FIG. 14 is a flowchart illustrating one example of operation for specifying posture based on the azimuth error.

FIG. 14 is a flowchart illustrating one example of operation for specifying posture based on the azimuth error. First, the control unit 110 calculates a gravity vector from the acceleration detected by the acceleration sensor 123 (S51). Further, the control unit 110 calculates initial values of the pitch angle and the roll angle from the gravity vector (S52). Subsequently, the control unit 110 detects pitch angular velocity (hereinafter, also referred to as "gyro pitch angular velocity") and roll angular velocity (hereinafter, also referred to as "gyro roll angular velocity") detected by the gyro sensor 122 (S53).

Subsequently, the control unit 110 calculates pitch angular velocity (hereinafter, also referred to as "geomagnetic pitch angular velocity") and roll angular velocity (hereinafter, also referred to as "geomagnetic roll angular velocity") based on the magnetic value detected by the magnetic sensor 121 (S54). Specifically, the control unit 110 may set declination when a geomagnetic vector is projected respectively on an XZ plane and a YZ plane as a geomagnetic roll angle and a geomagnetic pitch angle, and calculate amounts of change from angles 1 second before as geomagnetic roll angular velocity and geomagnetic pitch angular velocity.

Subsequently, the fluctuation measuring unit 111 measures temporal fluctuation of the magnetic value measured by the magnetic sensor 121 during movement of at least the magnetic sensor 121 or the information obtained based on the magnetic value, and the measurement error acquiring unit 112 calculates the geomagnetic azimuth error based on the fluctuation measured by the fluctuation measuring unit 111 (S55).

When the geomagnetic azimuth error exceeds 10° (S56: "Yes"), the specifying unit 113 calculates a new correction pitch angle by adding the gyro pitch angular velocity to the correction pitch angle 1 second before, and calculates a new correction roll angle by adding the gyro roll angular velocity to the correction roll angle 1 second before (S57), and the operation is shifted to S59. On the other hand, when the geomagnetic azimuth error falls below 10° (S56: "No"), the specifying unit 113 calculates a new correction pitch angle by adding the geomagnetic pitch angular velocity to the correction pitch angle 1 second before and calculates a new correction roll angle by adding the geomagnetic roll angular velocity to the correction roll angle 1 second before (S58), and the operation is shifted to S59. When the geomagnetic azimuth error is equal to 10°, the operation may be shifted to either S57 or S58.

The specifying unit 113 accumulates the correction pitch angle, the correction roll angle and the magnetic value in the buffer (S59), and the control unit 110 stands by for 1 second (S60) and shifts the operation to S53. It should be noted that while FIG. 14 illustrates a case where a threshold to be compared with the geomagnetic azimuth error is 10°, a magnitude of this threshold is not limited. Further, while FIG. 14 illustrates a case where the azimuth is corrected for each 1 second, a time interval for correcting the azimuth is not limited and may be changed as appropriate.

The method for specifying the azimuth or the posture based on the measurement error of the magnetic sensor 121 has been described above. It should be noted that the display control unit 115 can control the display unit 170 to display the azimuth or the posture of the magnetic sensor 121. Further, the display unit 170 can display the azimuth or the posture of the magnetic sensor 121.

<2-4. Correction of Measurement Position>

Figure 15:
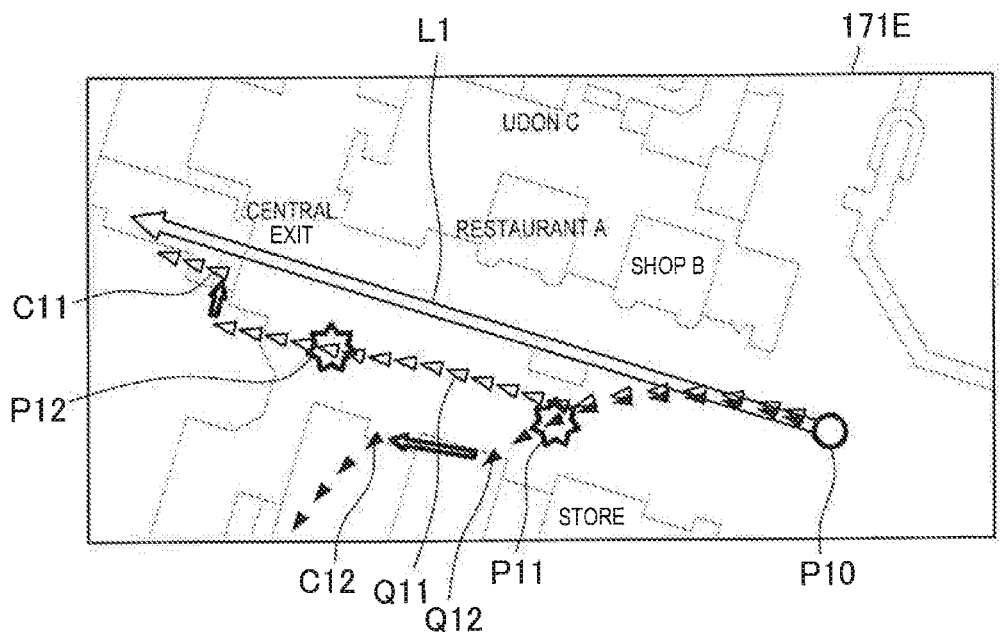
FIG. 15 is a diagram illustrating one example of correction of a positioning position using a map matching technique.

The method for specifying the azimuth or the posture using the sensor data has been described above. However, it is expected that specification of the azimuth or the posture by the information processing apparatus 100 according to the embodiment of the present disclosure provides further special advantages by using various functions in combination. For example, specification of the azimuth or the posture by the information processing apparatus 100 can be used in combination with correction of the positioning position using a technique of map matching. FIG. 15 is a diagram illustrating one example of the correction of the positioning position using the map matching technique.

The position acquiring unit 114 acquires the measurement position measured by the positioning sensor 124. As indicated in map information 171E, the display control unit 115 can control the display unit 170 to display the positioning position acquired by the position acquiring unit 114. The display unit 170 can display the positioning position acquired by the position acquiring unit 114. Here, the position acquiring unit 114 may correct the measurement position based on position information registered in advance using the map matching technique.

In the example illustrated in FIG. 15, position information respectively indicating positions C11 and C12 at which the user can exist is registered in advance, and the position acquiring unit 114 corrects the positioning position in the case where the information processing apparatus 100 according to the embodiment of the present disclosure is used to the position C11. Further, the position acquiring unit 114 corrects the positioning position in the case where the typical technique is used to the position C12. The positioning position may be corrected in the case where the positioning position is the same or similar to the position indicated in the position information registered in advance. Referring to FIG. 15, when the information processing apparatus 100 according to the embodiment of the present disclosure is used, the positioning position is corrected to the position C11 along the route L1, while when the typical technique is used, the positioning position is corrected to the position C12 which deviates from the route L1.

As in this example, if accuracy of specification of the azimuth or the posture is improved, particularly, when a technique for specifying the azimuth or the posture and the map matching technique are used in combination, it is possible to reduce a possibility that the positioning position is corrected to a wrong position. Particularly, a walking path as illustrated in FIG. 15 is highly likely to have a two-dimensional width compared to a vehicle road, and it is difficult to apply the map matching technique while the user moves on the walking path. Therefore, particularly, while the user moves on the walking path, it is effective to specify the azimuth with high accuracy as described in the embodiment of the present disclosure.

Figure 16:
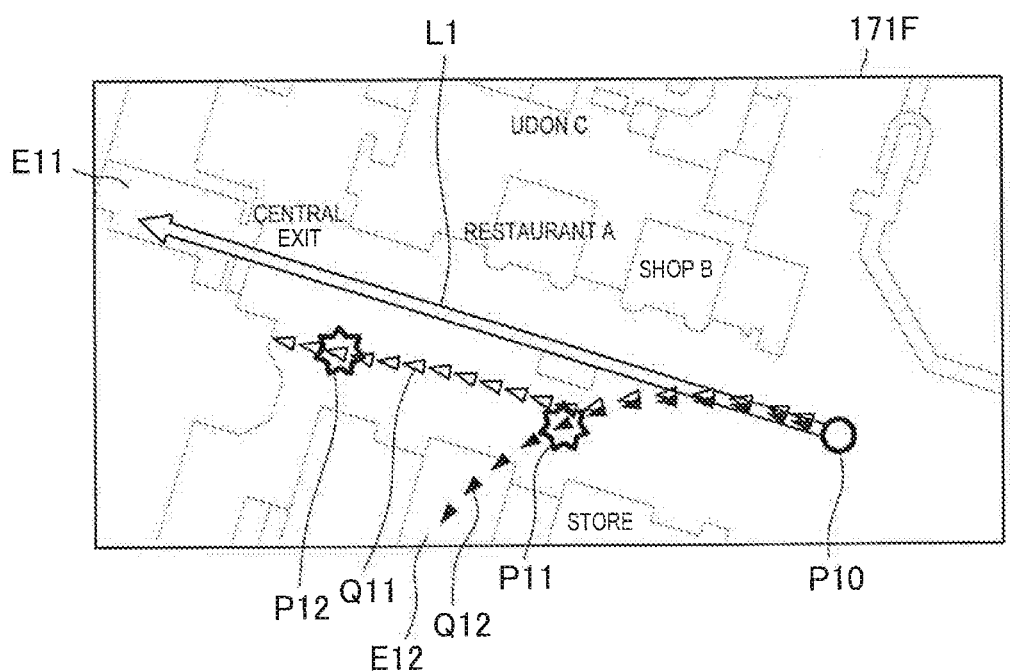
FIG. 16 is a diagram for explaining an example in which passage history is stored.

While the case where specification of the azimuth or the posture by the information processing apparatus 100 is used in combination with correction of the positioning position using the map matching technique has been described above, for example, specification of the azimuth or the posture by the information processing apparatus 100 can be used in combination with a technique for storing passage history of the user. FIG. 16 is a diagram for explaining an example in which the passage history is stored.

The position acquiring unit 114 acquires the measurement position measured by the positioning sensor 124. As indicated in map information 171F, the display control unit 115 can control the display unit 170 to display the positioning position acquired by the position acquiring unit 114. Further, the display unit 170 can display the positioning position acquired by the position acquiring unit 114. Here, the position acquiring unit 114 may select area identification information associated with position information which is the same as or close to the measurement position and store the area identification information as the passage history of the user.

In the example illustrated in FIG. 16, the area identification information for respectively identifying areas E11 and E12 in which the user can exist is registered in advance, and position information is associated with each area identification information. A type of areas is not particularly limited, and may be a location where an object which does not move such as a store exists or may be a location where an object which moves such as a person, a vehicle, a stand and a location of an event (such as fireworks) exists. In the example illustrated in FIG. 16, the area E11 is a ticket gate, and the area E12 is a store existing in an underground mall.

Further, in the example illustrated in FIG. 16, the position acquiring unit 114 acquires position information close to the positioning position in the case where the information processing apparatus 100 according to the embodiment of the present disclosure is used, selects area identification information of the area E11 associated with the position information and stores the area identification information as passage history of the user. Further, the position acquiring unit 114 acquires position information close to the positioning information in the case where the typical technique is used, selects area identification information of the area E12 associated with the position information and stores the area identification information as the passage history of the user.

Referring to FIG. 16, while the area identification information of the area E11 along the route L1 is stored as progression history when the information processing apparatus 100 according to the embodiment of the present disclosure is used, the area identification information of the area E12 which deviates from the route L1 is stored as the progression history when the typical technique is used.

As in this example, when accuracy of specification of the azimuth or the posture is improved, particularly, when a technique for specifying the azimuth or the posture is used in combination with a technique for storing the passage history of the user, it is possible to reduce a possibility that wrong passage history is stored. The passage history obtained in this manner may be utilized in any way. For example, it is possible to obtain preference information of the user by analyzing the passage history.

The case has been described where specification of the azimuth or the posture by the information processing apparatus 100 is used in combination with correction of the positioning position using the map matching technique or used in combination with the technique for storing the passage history of the user. However, specification of the azimuth or the posture by the information processing apparatus 100 can provide special advantages even when being used in combination with other techniques.

For example, specification of the azimuth or the posture by the information processing apparatus 100 can be used in combination with a technique for estimating an area reached by the user based on the user position and the azimuth of the user. Further, specification of the azimuth or the posture by the information processing apparatus 100 can be used in combination with a technique for estimating an area where the user exists based on the passage history. Specification of the azimuth or the posture by the information processing apparatus 100 can be used in combination with a technique for estimating an area where the user exists in a certain time zone based on passage history for each time zone.

3. Example of Hardware Structure

Subsequently, an example of a hardware structure of the information processing apparatus 100 according to the embodiment of the present disclosure will be described. FIG. 17 is a diagram illustrating the example of the hardware structure of the information processing apparatus 100 according to the embodiment of the present disclosure. However, the example of the hardware structure illustrated in FIG. 17 is merely one example of the hardware structure of the information processing apparatus 100. Therefore, the hardware structure of the information processing apparatus 100 is not limited to the example illustrated in FIG. 17.

As illustrated in FIG. 17, the information processing apparatus 100 includes a central processing unit (CPU) 801, a read only memory (ROM) 802, a random access memory (RAM) 803, a sensor 804, an input apparatus 808, an output apparatus 810, a storage apparatus 811 and a drive 812.

The CPU 801 which functions as an arithmetic processing apparatus and a control apparatus, controls the whole operation within the information processing apparatus 100 according to various kinds of programs. Further, the CPU 801 may be a microprocessor. The ROM 802 stores a program, an operation parameter, or the like, to be used by the CPU 801. The RAM 803 temporarily stores a program to be used during execution of the CPU 801, a parameter which changes as appropriate during the execution, or the like. These are connected to each other with a host bus configured with a CPU bus, or the like.

The sensor 804 is configured with a sensor for detecting a state of the information processing apparatus 100 and its peripheral circuit. Examples of the sensor 804 can include a magnetic sensor, a gyro sensor, an acceleration sensor and a positioning sensor. The sensor data detected by the sensor

804 is transmitted to the CPU 801. By this means, the CPU 801 can know the state (such as azimuth, angular velocity, acceleration and a position) of the information processing apparatus 100.

The input apparatus 808 is configured with an input unit such as a mouse, a keyboard, a touch panel, a button, a microphone, a switch and a lever for allowing the user to input information, an input control circuit which generates an input signal based on input by the user and outputs the input signal to the CPU 801, or the like. The user of the information processing apparatus 100 can input various kinds of data to the information processing apparatus 100 and instructs the information processing apparatus 100 to perform processing operation by operating the input apparatus 808.

The output apparatus 810 includes, for example, a liquid crystal display (LCD) apparatus, an organic light emitting diode (OLED) apparatus, and a display apparatus such as a lamp. Further, the output apparatus 810 may include a sound output apparatus such as a speaker and a headphone. For example, the display apparatus displays a picked up image, a generated image, or the like. Meanwhile, the sound output apparatus converts sound data into sound and outputs the sound.

The storage apparatus 811 is an apparatus for storing data configured as one example of the storage unit of the information processing apparatus 100. The storage apparatus 811 may include a storage medium, a recording apparatus which records data in the storage medium, a reading apparatus which reads out data from the storage medium, a deleting apparatus which deletes data recorded in the storage medium, or the like. The storage apparatus 811 stores a program executed by the CPU 801 and various kinds of data.

The drive 812 which is a reader/writer for storage medium, is incorporated into or externally attached to the information processing apparatus 100. The drive 812 reads out information recorded in the loaded removal storage medium such as a magnetic disc, an optical disc, a magnetic optical disc and a semiconductor memory and outputs the information to the RAM 803. Further, the drive 812 can write information in the removal storage medium.

The example of the hardware structure of the information processing apparatus 100 according to the embodiment of the present disclosure has been described above.

4. Conclusion

As described above, according to the embodiment of the present disclosure, the information processing apparatus 100 is provided which includes the fluctuation measuring unit 111 which measures temporal fluctuation of the magnetic value measured by the magnetic sensor 121 during movement of at least the magnetic sensor or information obtained based on the magnetic value, and the measurement error acquiring unit 112 which obtains the measurement error of the magnetic sensor 121 based on the fluctuation.

According to this configuration, spatial magnetic distribution measured during movement of the magnetic sensor 121 is reflected on the measurement error. It can be estimated that the spatial magnetic distribution has high correlation with the measurement error. Therefore, according to this method, it is possible to obtain a measurement error with higher accuracy. Further, according to this method, it is possible to provide an advantage of eliminating the necessity of preparing registration information in advance.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, a program for causing hardware, such as a CPU, ROM and RAM built into a computer, to exhibit functions similar to the functions included in the above described information processing apparatus 100 can be created. Further, a recording medium can also be provided which records these programs and is capable of performing reading to the computer.

Additionally, the present technology may also be configured as below.

(1)

An information processing apparatus including:
 a fluctuation measuring unit configured to measure temporal fluctuation of a magnetic value measured by a magnetic sensor during movement of at least the magnetic sensor or information obtained based on the magnetic value; and
 a measurement error acquiring unit configured to obtain a measurement error of the magnetic sensor based on the fluctuation.

(2)

The information processing apparatus according to (1), including:
 a specifying unit configured to specify azimuth or posture based on the measurement error of the magnetic sensor.

(3)

The information processing apparatus according to (2),
 wherein the specifying unit increases weight of correction to the azimuth or the posture using other sensor data as the measurement error of the magnetic sensor is higher.

(4)

The information processing apparatus according to (3),
 wherein the specifying unit corrects the azimuth or the posture based on the other sensor data when the measurement error of the magnetic sensor exceeds a threshold.

(5)

The information processing apparatus according to (4),
 wherein the specifying unit corrects the azimuth or the posture of the magnetic sensor based on angular velocity measured by a gyro sensor when the measurement error of the magnetic sensor exceeds the threshold.

(6)

The information processing apparatus according to (3) or (4),
 wherein the specifying unit specifies the azimuth or the posture based on the measurement error of the magnetic sensor and a measurement error of another sensor.

(7)

The information processing apparatus according to (6),
 wherein the specifying unit corrects the azimuth or the posture based on sensor data measured by the other sensor when the measurement error of the magnetic sensor exceeds the measurement error of the other sensor.

(8)

The information processing apparatus according to (7),
 wherein the specifying unit corrects the azimuth or the posture based on angular velocity measured by a gyro sensor when the measurement error of the magnetic sensor exceeds a measurement error of the gyro sensor.

(9)
The information processing apparatus according to any one of (2) to (8), including:
a position acquiring unit configured to acquire a measurement position measured by a positioning sensor.

(10)
The information processing apparatus according to (9),
wherein the position acquiring unit corrects the measurement position based on position information registered in advance.

(11)
The information processing apparatus according to (9) or (10),
wherein the position acquiring unit selects area identification information associated with position information which is the same as or close to the measurement position and stores the area identification information as passage history of a user.

(12)
The information processing apparatus according to any one of (1) to (11),
wherein the fluctuation measuring unit measures the fluctuation while the magnetic sensor is stopped.

(13)
The information processing apparatus according to any one of (2) to (12), including:
a display control unit configured to control the azimuth or the posture to be displayed.

(14)
The information processing apparatus according to (13), including:
a display unit configured to display the azimuth or the posture.

(15)
The information processing apparatus according to (1),
wherein the fluctuation measuring unit measures, as the fluctuation, a difference value of magnetic values at first measurement time and second measurement time or information obtained based on the magnetic values.

(16)
The information processing apparatus according to (15),
wherein the first measurement time and the second measurement time have a predetermined time interval therebetween.

(17)
The information processing apparatus according to (15),
wherein among the magnetic values measured within a predetermined time period or the information obtained based on the magnetic values, the first measurement time is a maximum value, and the second measurement time is a minimum value.

(18)
The information processing apparatus according to any one of (15) to (17),
wherein the measurement error acquiring unit obtains a result of multiplication of the difference value and a fixed coefficient or the difference value as the measurement error of the magnetic sensor.

(19)
An information processing method including:
measuring temporal fluctuation of a magnetic value measured by a magnetic sensor during movement of at least the magnetic sensor or information obtained based on the magnetic value; and
obtaining a measurement error of the magnetic sensor based on the fluctuation.

(20)
A computer-readable recording medium recording a program thereon, the program causing a computer to function as an information processing apparatus including
a fluctuation measuring unit configured to measure temporal fluctuation of a magnetic value measured by a magnetic sensor during movement of at least the magnetic sensor or information obtained based on the magnetic value, and
a measurement error acquiring unit configured to obtain a measurement error of the magnetic sensor based on the fluctuation.

REFERENCE SIGNS LIST 100 information processing apparatus
110 control unit
111 fluctuation measuring unit
112 measurement error acquiring unit
113 specifying unit
114 position acquiring unit
115 display control unit
120 sensor unit
121 magnetic sensor
122 gyro sensor
123 acceleration sensor
124 positioning sensor
140 input unit
150 storage unit
170 display unit

The invention claimed is:

1. An information processing apparatus comprising:
a fluctuation measuring unit configured to measure temporal fluctuation of a magnetic value measured by a magnetic sensor during movement of at least the magnetic sensor or information obtained based on the magnetic value; and
a measurement error acquiring unit configured to obtain a measurement error of the magnetic sensor based on the fluctuation.

2. The information processing apparatus according to claim 1, comprising:
a specifying unit configured to specify azimuth or posture based on the measurement error of the magnetic sensor.

3. The information processing apparatus according to claim 2,
wherein the specifying unit increases weight of correction to the azimuth or the posture using other sensor data as the measurement error of the magnetic sensor is higher.

4. The information processing apparatus according to claim 3,
wherein the specifying unit corrects the azimuth or the posture based on the other sensor data when the measurement error of the magnetic sensor exceeds a threshold.

5. The information processing apparatus according to claim 4,
wherein the specifying unit corrects the azimuth or the posture of the magnetic sensor based on angular velocity measured by a gyro sensor when the measurement error of the magnetic sensor exceeds the threshold.

6. The information processing apparatus according to claim 3,
wherein the specifying unit specifies the azimuth or the posture based on the measurement error of the magnetic sensor and a measurement error of another sensor.

7. The information processing apparatus according to claim 6,
wherein the specifying unit corrects the azimuth or the posture based on sensor data measured by the other sensor when the measurement error of the magnetic sensor exceeds the measurement error of the other sensor.

8. The information processing apparatus according to claim 7,
wherein the specifying unit corrects the azimuth or the posture based on angular velocity measured by a gyro sensor when the measurement error of the magnetic sensor exceeds a measurement error of the gyro sensor.

9. The information processing apparatus according to claim 2, comprising:
a position acquiring unit configured to acquire a measurement position measured by a positioning sensor.

10. The information processing apparatus according to claim 9,
wherein the position acquiring unit corrects the measurement position based on position information registered in advance.

11. The information processing apparatus according to claim 9,
wherein the position acquiring unit selects area identification information associated with position information which is the same as or close to the measurement position and stores the area identification information as passage history of a user.

12. The information processing apparatus according to claim 1,
wherein the fluctuation measuring unit measures the fluctuation while the magnetic sensor is stopped.

13. The information processing apparatus according to claim 2, comprising:
a display control unit configured to control the azimuth or the posture to be displayed.

14. The information processing apparatus according to claim 13, comprising:
a display unit configured to display the azimuth or the posture.

15. The information processing apparatus according to claim 1,
wherein the fluctuation measuring unit measures, as the fluctuation, a difference value of magnetic values at first measurement time and second measurement time or information obtained based on the magnetic values.

16. The information processing apparatus according to claim 15,
wherein the first measurement time and the second measurement time have a predetermined time interval therebetween.

17. The information processing apparatus according to claim 15,
wherein among the magnetic values measured within a predetermined time period or the information obtained based on the magnetic values, the first measurement time is a maximum value, and the second measurement time is a minimum value.

18. The information processing apparatus according to claim 15,
wherein the measurement error acquiring unit obtains a result of multiplication of the difference value and a fixed coefficient or the difference value as the measurement error of the magnetic sensor.

19. An information processing method comprising:
measuring temporal fluctuation of a magnetic value measured by a magnetic sensor during movement of at least the magnetic sensor or information obtained based on the magnetic value; and
obtaining a measurement error of the magnetic sensor based on the fluctuation.

20. A computer-readable recording medium recording a program thereon, the program causing a computer to function as an information processing apparatus including
a fluctuation measuring unit configured to measure temporal fluctuation of a magnetic value measured by a magnetic sensor during movement of at least the magnetic sensor or information obtained based on the magnetic value, and
a measurement error acquiring unit configured to obtain a measurement error of the magnetic sensor based on the fluctuation.

* * * * *